United States Patent [19]

Eizenhöffer et al.

[11] Patent Number: 4,799,252

[45] Date of Patent: Jan. 17, 1989

[54] DIGITAL RADIO TRANSMISSION SYSTEM

[75] Inventors: Alfons Eizenhöffer, Altdorf; Hans-Gorg Preller, Grossenseebach, both of Fed. Rep. of Germany

[73] Assignee: U.S. Philips Corp., New York, N.Y.

[21] Appl. No.: 168,620

[22] Filed: Mar. 7, 1988

Related U.S. Application Data

[63] Continuation of Ser. No. 891,936, Jul. 30, 1986, abandoned.

[30] Foreign Application Priority Data

Jul. 31, 1985 [DE] Fed. Rep. of Germany ....... 3527331

[51] Int. Cl.$^4$ ............................................. H01Q 7/04
[52] U.S. Cl. ....................................... 379/59; 370/50; 455/33
[58] Field of Search ....................... 379/63, 58, 59, 60, 379/56; 455/33, 38, 56, 32; 340/825.44; 370/50, 95, 18

[56] References Cited

U.S. PATENT DOCUMENTS

| | | | |
|---|---|---|---|
| 4,052,563 | 10/1977 | Nodd | 370/18 |
| 4,171,464 | 10/1979 | Evenchik | 370/50 |
| 4,215,244 | 7/1980 | Gutleber | 370/116 |
| 4,237,551 | 12/1980 | Narashima | 370/50 |
| 4,301,530 | 11/1981 | Gutleber | 370/18 |
| 4,514,853 | 4/1985 | Gutleber | 375/34 |
| 4,688,210 | 4/1987 | Eizenhoffer et al. | 370/18 |
| 4,697,260 | 9/1987 | Grauel et al. | 370/18 |

*Primary Examiner*—Robert Lev
*Attorney, Agent, or Firm*—Thomas A. Briody; Leroy Eason

[57] ABSTRACT

A cellular digital radio transmission system which increases the number of available communication channels between base stations and mobile stations in such system. Message transmission from a base station to its assigned mobile stations is effected by a combination of time-division, code-division and frequency-division multiplexing. Message transmission from the mobile stations assigned to a particular base station is effected by at least one of such multiplexing modes.

3 Claims, 3 Drawing Sheets

DIGITAL RADIO TRANSMISSION SYSTEM

This is a continuation of application Ser. No. 891,936, filed July 30, 1986 now abandoned.

BACKGROUND OF THE INVENTION

1. Field of the Invention

The invention relates to a cellular digital radio transmission system employing combinations of different modes of multiplexing for transmission of messages between the base stations and the mobile stations in such systems.

2. Description of the Related Art

There are three known basic methods for sending digital messages over a transmission medium (e.g. transmission line, radio channel): these are code-division multiplexing, frequency-division multiplexing and time-division multiplexing.

In the code-division multiplexing method the different messages sent over a common transmission medium are imposed by, for example, baseband modulation on a carrier and the resultant narrow-band signal (narrow in relation to the bandwidth of the channel) is spectrally spread over the channel bandwidth by multiplex modulation using a codeword that characterises the receiver.

Recognition of the signal at the receiver takes place not by time-division or frequency-division selection but on the basis of the spectral coding. The multiply stacked spectrally-coded messages in the code-division multiplex channel are selected in the receiver on the basis of their allocated codeword.

In the frequency-division multiplexing method the whole bandwidth available for message transmission is divided into narrow frequency bands, each of which corresponds to one message transmission channel. This narrow frequency band is at the disposal of the user for the duration of the message transmission.

In the time-division multiplexing method each user has available to him the whole bandwidth of a single transmission channel but only for short intervals of time. The characters or sequences of characters of various users are interleaved and are sent out with a correspondingly higher bit rate, the time channel allocated to each user being periodically repeated after the duration of each frame period.

From West German Pat. No. DE-OS 25 37 683 a radio transmission system with base stations and mobile stations is known, in which signalling channel access is effected by either asynchronous time-division multiplex, code-division multiplex or frequency-division multiplex.

For codeword synchronization incoherent carrier demodulation is used. A code generator consecutively generates one of the nine different codes which characterize the base stations. After this code has been synchronized with a received signal the corresponding intermediate-frequency signal is multiplied by it, thereby transforming the broad received signal spectrum into the massage channel bandwidth. The received message can then be recovered by means of, for example, a DPSK demodulator. For synchronization, the message is prefixed by a characteristic code pattern with a length of, for example, 15 bits.

Also known are combinations of the aforesaid methods and their application in a digital radio transmission system. For example, in "Nachrichtentechnik, Elektronik+Telematic 38 (1984), Vol. 7, pages 264 to 268" a digital radio transmission system is described in which the time-division multiplex method is used in combination with spectral coding, but in which the various users are not separated by means of the code-division multiplex method. In the time channels for speech and/or data message transmission (TCH communication channel) a bit sequence for establishing synchronism, a frame-synchronization word and the bit sequence of the message itself are transmitted one after the other. The time channels for message transmission (3×20 TCH) are arranged with organization channels (3 CCH) to form a time-division multiplex frame with a duration of 31.5 msec. If the message to be transmitted is a speech signal, adaptive delta modulation can be used for analog/digital conversion. A code is superimposed on the resultant message characters (bits) in the sender. It has proved advantageous to group the individual message bits into blocks of four bits each and to spread the resultant blocks with an orthogonal alphabet. The spreading factor used as a compromise designed to combine the advantages of band spreading with the requirement to use the frequencies economically.

A message transmission method has also been proposed, see published West German patent application No. (P 34 47 107.3), corresponding to copending U.S. application Ser. No. 810,439 assigned to applicants' assignee, whereby a different modulation system is used for the forward and reverse directions of the message transmission channel. For message transmission to the base station the mobile stations use one of a multiplicity of communication channels. In the direction from the base station to its satellite mobile stations each communication channel is separated by bandspread modulation.

The spread communication channels are superimposed on each other and the resultant broadband sum signal is transmitted in a common frequency band. In the direction from the mobile stations to the base station the messages are transmitted in separate narrowband frequency channels.

For speech transmission from the base station to the mobile stations the bandspread modulation used is selected by the base station and communicated to the mobile station when building up the communication link. For the transmission of signalling to the mobile stations allotted to the base station, a common bandspread modulation is used for all mobile stations in the direction from the base station to the mobile stations.

To distinguish between base stations configured in neighbouring transmitting cells, these stations transmit to the mobile stations in different frequency bands. The base stations are provided with narrowband receivers which, during operation, can be switched to several different frequency channels. The number of switchable transmitting frequencies in the mobile stations is smaller than the number of switchable receiving frequencies in the base station. For example, in the base station it is possible to switchover to 1,000 frequencies, whereas in the mobile station it is possible to switchover to 40 frequencies.

In each base station the receiving frequencies used are organized in order to optimize the interference situation. In the event of reception disturbances the relevant connection from the mobile station to the base station is switched to another undisturbed frequency channel to which both the base station and the mobile station can changeover. The receiving connection in the base station to the public telephone system continues to take part in the connection.

SUMMARY OF THE INVENTION

The object of the invention is to form communication channels in a cellular digital radio transmission system in such a way that it is possible to adapt to inhomogeneous traffic densities and reduce costs of the transmitter in the base station and the receiver in the mobile station.

By the use of bandspread modulation in the transmission direction from the base station, to the mobile stations multi-paths can be resolved and evaluated and interferences largely avoided. When different codes and the same frequency band are used in the various cells of the digital radio transmission system (separation of communication channels in the cells of a cluster by code multiplexing) the same frequency can be repeated more often in the cell structure than in a straight-forward frequency-division multiplex system. In this way the transmission procedure makes more economical use of available frequencies.

Through the use of different codes in the cells of a cluster (separation of the communication channels of mobile stations within the same cell by code multiplexing) additional communication channels are made available within a cell.

Through the use of different frequency bands with a bandwidth of suitable flexibility for radio network planning, it is possible in neighbouring cells and also within a particular cell of a digital radio transmission system in accordance with the invention to adapt effectively to inhomogeneous traffic densities. This is done in the first place by forming large radio cells for low traffic densities and small radio cells for high traffic densities, and on the other hand by employing several frequency bands within a high-density cell. The use of this frequency-division multiplex method (channel sets) makes it easier to switch from large to small cells. In cells with very high traffic density several channel sets can be operated with the frequency-division multiplex method (communication channels with the same code set) so that the formation of very small cells can be avoided.

By using the time-division multiplex method additional communication channels can be created in each code level, so that the transmission capacity in the digital radio transmission system can be further increased. In this way fewer transmitting devices are needed in the base station than in the case of a pure frequency-division multiplex system.

In both transmission directions of the digital radio transmission system different combinations of multiplexing methods are used for the grouping of communication channels. The message to be transmitted can also be included in the communication channels by using a combination of code multiplexing, time-division multiplexing and frequency-division multiplexing, in a transmission system in which transmission takes place in only one direction. By applying the code-multiplexing method a transmission system that makes economical use of frequencies is then obtained when the signals all arrive at the receiver in synchronization and with the same power, which can be done in transmission from a stationary base station to each individual mobile station.

BRIEF DESCRIPTION OF THE DRAWINGS

The formation of the communication channels in a digital radio transmission system is described in more detail in the following with reference to the Figures, in which.

DESCRIPTION OF THE PREFERRED EMBODIMENTS

Figure 1:
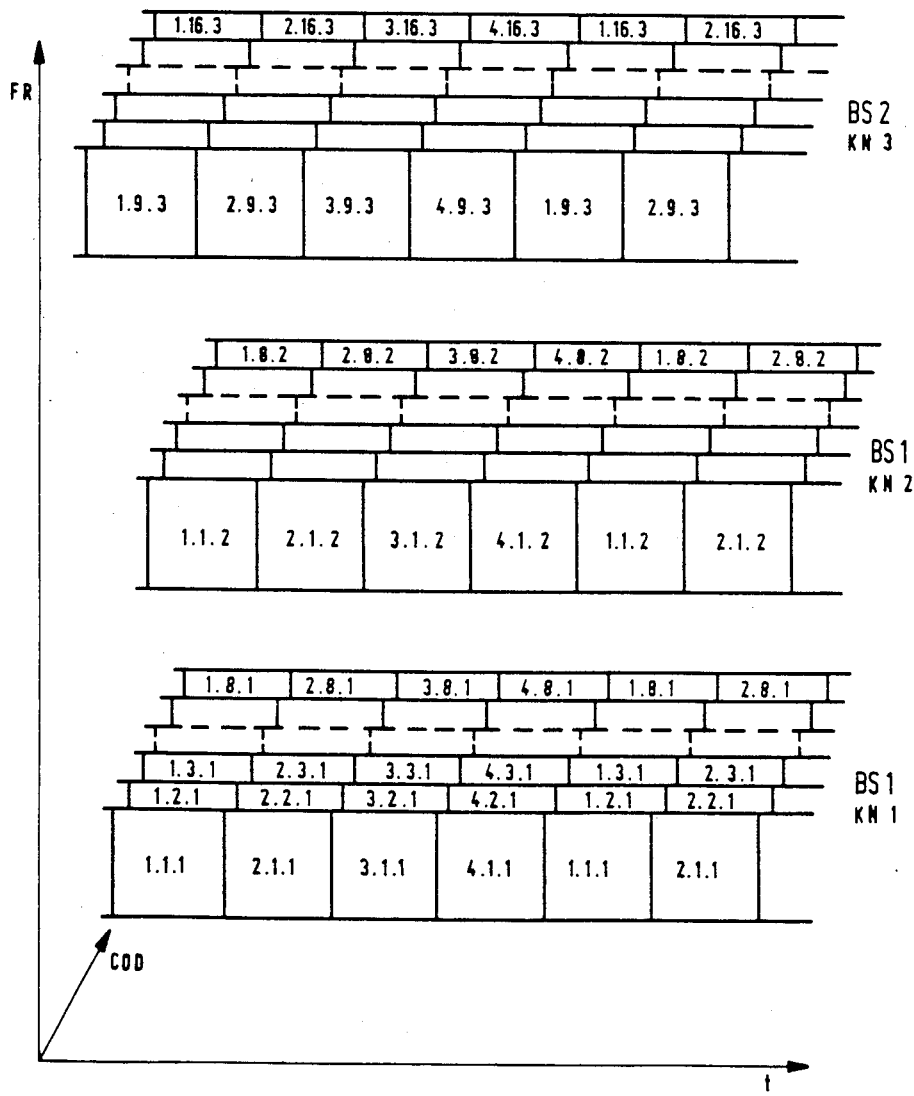
FIG. 1 shows the multiplexing within one cell of a cellular radio transmission system.

In a cellular digital radio transmission system permanent base stations BS are arranged in a cellular configuration. To each base station BS a number of radio communication channels are allocated, over which messages are transmitted to mobile radio stations MS.

In the two transmission directions different combinations of multiplexing methods are used for grouping the communication channels. In the direction of transmission from the base station BS to the mobile stations MS the message to be transmitted (speech or data) is introduced into the communication channels using code-division multiplexing, time-division multiplexing and frequency-division multiplexing methods. For this purpose the base station BS transmitter is provided inter alia with a TDM multiplexer 3, a codeword generator 5 and a frequency synthesizer 9 (see FIG. 4). In the mobile station MS the communication channels of the received digital signal are separated using the code-division multiplexing, time-division multiplexing and frequency-division multiplexing methods. For this purpose the mobile station MS is provided inter alia with a frequency synthesizer 19, correlators 24 and 25 and a TDM demultiplexer 31 (see FIG. 5). For the direction of transmission from the mobile stations MS to the base station BS the transmission takes place in separated narrowband frequency channels. In the following a description will be given of the multiplexing performed for the direction of transmission from the base station BS to the mobile stations MS.

A base station BS has for example at least one set of channels consisting of 32 communication channels. The individual communication channels for the different mobile stations MS in a set of channels are separated from each other by different bandspread codewords (CDMA) and/or different time slots (TDMA). FIG. 1 shows three of such sets KN of channels, and in the example shown the channel sets 1 and 2 belong to the same cell and channel set KN 3 belongs to a neighbouring cell. The characterization of the individual communication channels (channel identification) is illustrated in FIG. 1 by the sequence of three-digit numbers. The first digit represents the number of the relevant time slot, the second digit the codeword used, and the third digit the number of the relevant carrier frequency. The grouping of the communication channels in the direction of transmission from the base station BS to the mobile stations MS is effectuated by the consecutive methods of time-division, code-division and frequency-division multiplexing. This preferred sequence facilitates the implementation of the sending and receiving devices in the digital radio transmission system.

A channel set is built up for example, first by grouping together several time slots, each of which contains the information for one particular user, to form a time-division multiplex frame. In FIG. 1 each time-division multiplex frame comprises four time slots, e.g. communication channel 1.1.1 to 4.1.1.

Next the information in such time-division multiplex frames, is spread with suitably chosen codewords, which make it possible to transmit simultaneously several time-division multiplex frames with the same carrier frequency. The spreading of each of these time-division multiplex frames is done with codewords which in this set of channels are respectively allocated to the time-division multiplex frame. This means on the one hand that within a channel set each time-division multiplex frame contains for the spreading operation a specific codeword that differs from those of the other time-division multiplex frames, and on the other hand that the information in the time slots of a given time-division multiplex frame is spread with the same codeword.

In the embodiment shown in FIG. 1 eight different codewords per channel set of each base station are used, that is to say a channel set contains eight different time-division multiplex frames each with four time channels, together totalling 32 communication channels per channel set at a given carrier frequency.

By providing selected code symbols for the spreading operation, as for example pseudo-random, orthogonal or quasi-orthogonal codewords, it is possible at the same time to transmit messages in code-division multiplex. The eight individual spreading codes show a spread of 31, that is to say a length of 31 chips. All code-division multiplex channels are thereby transmitted from the transmitter of the base station BS with the same power and synchronously in time. By using four symbols in each code-division multiplex channel (the four symbols can for example be represented by two antipodal codewords) it is possible to combine two bits of the useful signal to form one symbol. This has the effect of having the symbol rate as compared with the bit rate of the baseband. For the coding of the baseband signal and for synchronization there are six different symbols available, two of which are used exclusively for the synchronization. If eight individual spreading code levels are formed with four time-set channels, 32 communication channels of for example 16 kbit/s can be transmitted, which, after code-division spreading, are modulated on a common RF carrier. When four-phase modulation is used, the transmission of 32 communication channels takes e.g. a bandwidth of 1.25 MHz. The time-stacking and hence the number of communication channels per spreading code level depends on the bit rate needed for each message transmission channel.

The grouping of the communication channels in the digital radio transmission system in accordance with the invention offers several advantages. These are:
 reduction of Rayleigh fading effect,
 avoidance of intersymbol interferences,
 economic use of frequencies,
 flexible and easy adaptation to different traffic densities,
 simple extensibility of the system,
 flexibility in re-use planning,
 simple frequency coordination with other countries or systems.

Due to the combination of every two bits to form one of four possible symbols, the symbol duration of 25 $\mu$s remains sufficiently long to avoid intersymbol interference caused by multipath reception, while on the other hand the outlay on the receiving hardware for the correlator system is low. The 16 spreading codes used within one base station BS to separate the code levels are for example orthogonal pairs, while the different synchronization symbols in several base stations BS with the same carrier should show minimum cross-correlation products for any given time shift.

The spreading can be performed for example with Gold codes. A change in the spreading code has little influence on the receiving equipment, since it contains programmable correlators which can be reset from one connection to another upon instruction from the base station BS. An organization channel can be provided for the transmission of such resetting information and for the separation of the individual time channels (communication channels) into time-division multiplex frames.

As already described, the time-division multiplex frames of a channel set are superimposed on one another in the transmitter of the base station BS, given the same amplification and transmitted on an RF carrier via an antenna. In the receiver of the mobile station MS the received digital signal is mixed in baseband. In the time slot allocated to this mobile station when building up the connection the information is then recovered by correlation with the codeword used for this communication channel, which codeword is communicated at the same time to the mobile station. In the receiver of the mobile station MS the separation of the communication channels of the received digital signal thus takes place in reverse order, that is to say demultiplexing in terms of frequency, code and time, as in the grouping of the communication channels in the base station BS. Given a frame length of e.g. 20 ms for the time-division multiplex frame, a symbol duration in the spreading codeword of 25 $\mu$s and a spread of 31, the chip duration lies at 0.806 ns and the chip rate at 1.24 Mcps. The chip duration is thus short enough to allow sufficient resolution and utilization of multipaths and to largely eliminate fading effects.

As remarked, at least one organization channel is provided per set of channels, which is used by the mobile station MS for building up a connection and for the performance of certain special services. The mobile stations MS know the frequency status of the possible channel sets, the relevant time channel and the codewords for the organization channels provided within the digital radio transmission system. With this knowledge a mobile station MS can look for the suitable organization channel for its purposes and they receive all necessary information for operation (e.g. frequency of the narrowband communication from the mobile station MS to the base station BS in the relevant organization channel) and for building up the connection (e.g. time channel and codeword for communication from the base station BS to the mobile station MS, and the frequency for the narrowband communication from the mobile station MS to the base station BS).

If more than 32 communication channels are needed in a base station BS, then several channel sets can be superimposed on each other by frequency-division multiplexing. The different channel sets are transmitted with different RF carrier frequencies. In FIG. 1 the channel sets KN 1 and 2 are allocated to the base station BS1. For both channel sets allocated to the base station BS1 the same codewords can be used because they are transmitted at different carrier frequencies.

Separation of the communication channels of neighbouring base stations BS is performed either by frequency-division multiplexing (different RF carriers for the channel sets used in these base stations BS), using code-division multiplexing (different codeword sets for the channel sets used) or by combinations of both multiplexing methods. In the embodiment illustrated in FIG. 1 channel set KN 3 of base station BS2 differs from the two channel sets KN 1 and 2 of base station BS1 both in codeword set (second digit of channel identification) and in the RF carrier frequency used (third digit in channel identification). With sufficiently large spatial intervals (determined by interchannel interferences) from one cell to another, a channel set (RF carrier and/or codeword set) in this cell can be repeated (see FIG. 2 and FIG. 3). The possibility of using the same RF carrier frequency in the remote cell and/or to use different codeword sets results in additional flexibility and freedom in re-use planning and facilitates the introduction of small-cell structures.

Figure 2:
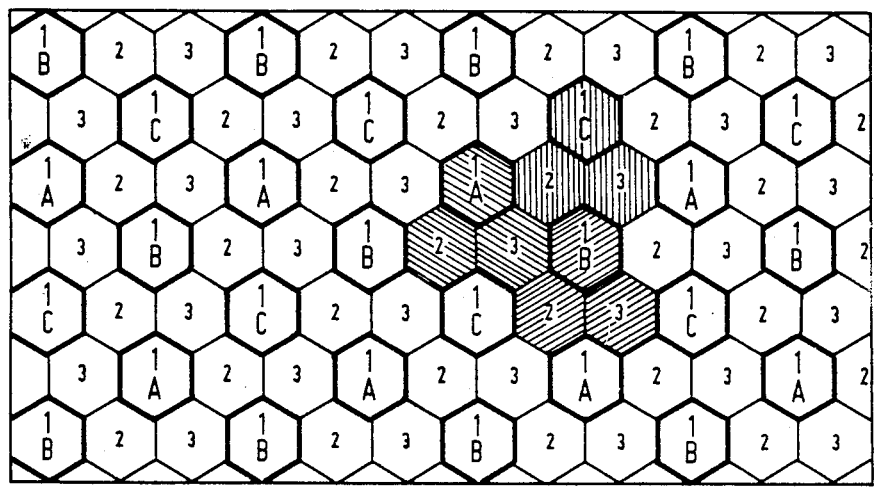
FIG. 2 shows the frequency repetition in the cell structure for three different code sets.
Figure 3:
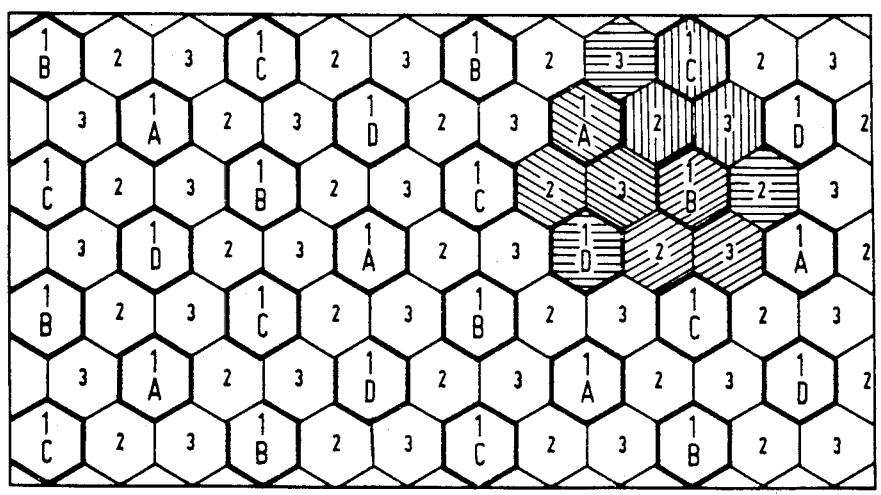
FIG. 3 shows the frequency repetition in the cell structure for four different code sets.

In the radio transmission system according to the invention no fixed duplex distance is required between an outgoing and incoming channel, so that a method of dynamic, flexible channel allocation can be adopted, permitting a smaller "effective" common channel repetition distance and hence a larger network capacity. FIGS. 2 and 3 show the frequency allocation in homogeneous networks (or homogeneous sub-networks) where the radio cells are combined to form clusters of several cells. In the different cells of a cluster different channel sets are used. Within one cell several channel sets of the base station BS can be allocated. The distribution of the channel sets in a cluster of cells is periodically repeated at spatial intervals. Connected with the size of the cell cluster is a specific common channel repetition distance, so that in the design of the network the common channel repetition distance and hence the size of the cell cluster should be chosen in such a way as to fulfil certain requirements as regards freedom from interference in the network. For example, if the radio transmission system has an overall bandwidth of 25 MHz available, 20 channel sets (each with 32 communication channels) with a transmission bandwidth per set of about 1.25 MHz can be formed. If neighbouring radio cells are separated by different carrier frequencies and channel cells by different codewords, it is then possible in the broadband direction, i.e. in the direction from the base station BS to the mobile stations MS, to form cell clusters with for example three or four cells per cluster (see FIG. 2 and FIG. 3). In FIGS. 2 and 3 the digits 1, 2 and 3 denote three different carrier frequencies and the letters A to D denote four different code sets. In a cluster of three cells having the same carrier frequency, and using three different code sets, a frequency and code set repetition takes place in each ninth cell. If, as illustrated in FIG. 3, four different code sets are used, a repetition of the same frequency-code combination occurs after each twelfth cell.

For the direction of transmission from the mobile stations MS to the base station BS provision can be made, for example, for narrowband transmission with frequency channels in the 25 kHz raster. In the cells themselves the frequency distribution is not fixed but is left to the decision of the base station BS.

Figure 4:
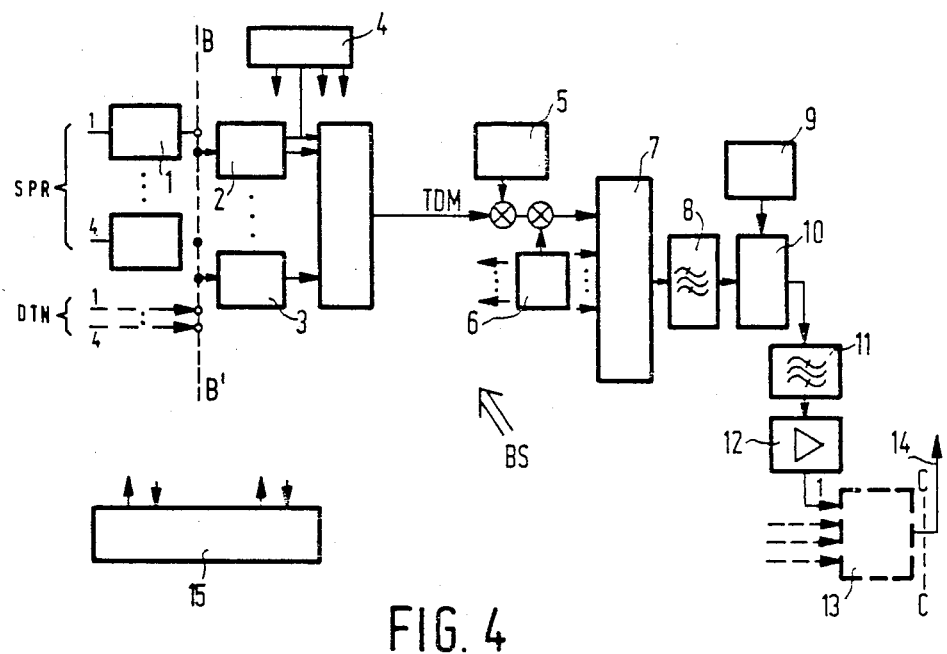
FIG. 4 shows a block diagram of the transmitting part of the base station and FIG. 5 shows a block diagram of the receiving part in the mobile station.

FIG. 4 shows a block diagram of the transmitter of the base station BS. The data/speech signals transmitted in baseband are composed as follows. The digitized speech in each channel is first recoded in a transcoder 1 from PCM to the transmission system required for the transmission, with a correspondingly smaller bit rate. At the intersection B-B' a data source can be connected. In a channel coder 2 connected to the data source or transcoder 1 special channel coding is added to protect significant bits against transmission errors in the transmission channel. This channel coding may differ, depending on the transmitting service. In a multiplexer 3 connected to the channel coder 2 the signalling accompanying the data flow is added, together with the synchronization information from a sync circuit 4. The TDM signal (Time Division Multiplex signal) at the output of the TDM multiplexer 3 thus contains, in the embodiment illustrated in FIG. 4, four speech/data channels, one signalling channel accompanying the connection (for a TDM cluster of channels) and the synchronization bits required for synchronization in the mobile stations MS. The synchronization bits are merged with the TDM signal, as proposed in published West German patent application P 35 11 430.4 (corresponding to U.S. Pat. No. 4,688,210).

The TDM signal at the output of multiplexer 3 is multiplied by the codewords from the relevant code generator 5, whereby two bits are combined to form one symbol and are spread with the desired code. The spread signal is then modulated by a method adapted to the properties of the transmission channels, whereby for example the spread signal is keyed so as to shift the phase of a carrier signal from an oscillator 6, resulting in a signal carrying the information and the codeword and which is modulated with a lower intermediate frequency (Binary Phase Shift Keying, BPSK). The modulated CDM signal is fed to an adder 7 whose output is connected to a bandpass filter 8. Eight of these modulated CDM signals, after addition and bandpass filtering, form a multistage-amplitude composite signal which is finally converted to the end frequency.

For this purpose a frequency mixer oscillator is provided as a synthesizer 9, which can be switched in corresponding steps within the frequency range of the digital radio transmission system. The synthesizer 9 is designed only for the few possible frequencies of the FDM stage (Frequency Division Multiplex stage). Mixing of the CDM signals with the frequency delivered by the corresponding synthesizer 9 is performed in a circuit 10 which is connected to a bandpass filter 11. The output of the bandpass filter 11 is connected to a power amplifier 12, from which the filtered and amplified transmission signal goes via a coupling device 13 to the antenna 14. In smaller base stations BS with up to 32 message transmission channels the antenna coupling device 13 is not required.

A control circuit 15 in the base station BS takes care of the setting of the channel coders and code generators, the correct choice of channel coding and the addition of announcements in the organization data flow. The transmission channel selected for this purpose may be a TDM channel in a CDM plane (see No. P 35 11 430.4).

Figure 5:
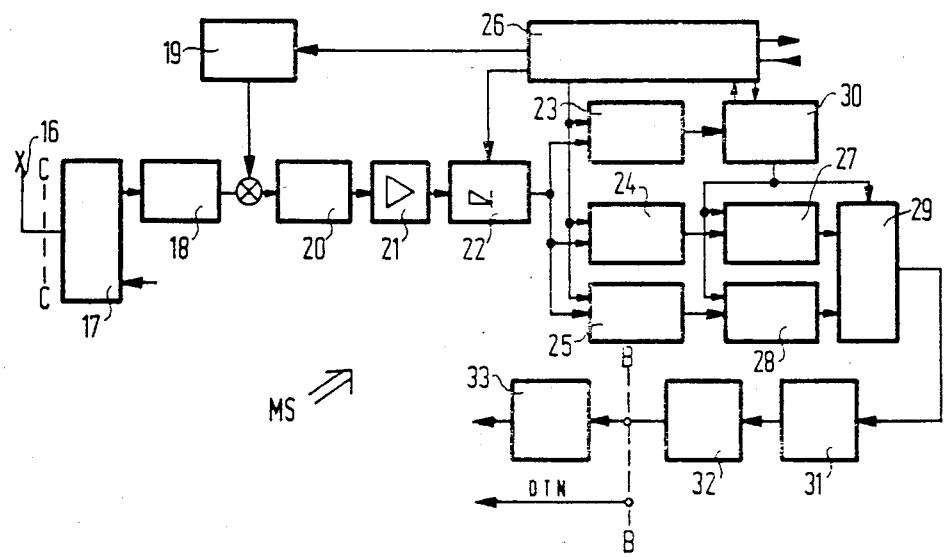

FIG. 5 shows a block diagram of the receiving part of a mobile station MS. The signal received from a common transmitting/receiving antenna 16 passes through the reception filter of a duplexer 17 to the input R.F. stage 18 of the receiver. The requirements to be met by the reception filter of the duplexer 17 are not very stringent, so that mobile stations MS with simple service functions, e.g. simple data signalling, can be relatively inexpensive. In the input R.F. stage 18 the signal is amplified and then mixed with a frequency from the synthesizer 19 to form an intermediate-frequency signal.

The intermediate frequency signal is fed to an IF stage 20, where it is further amplified and filtered. As in the case of the synthesizer 19 in the base station BS, a simpler type can be used for the synthesizer 9 in the mobile station MS, which can be produced more cheaply. The IF stage 20 contains filters which serve to delimit neighbouring channel selection against neighbouring broadband channels and to suppress mixing products on it. The actual noise filtering takes place in correlators 23, 24 and 25. Connected to the IF stage 20 is an amplitude control circuit 21 which raises the output signal of the IF stage 20 to a level sufficient to drive the subsequent stages and prevents possible overloading of these circuits. The amplitude control circuit 21 uses estimates to equalize variations in field strength and level fluctuations, thus permitting linear processing of the signals in the subsequent circuits of the mobile station MS. The control time-constant of the amplitude control circuit 21 depends essentially on these estimates.

The power-controlled IF signal at the output of the amplitude control circuit 21 is converted into baseband in a demodulator 22 connected to 21. Using BPSK modulation for example, this can be done in accordance with the Costas loop principle, which applies to both frequency and phase. From the polarity of the received synchronization words it it possible (see No. P 35 11 430.4) to recognize and equalize ambiguities of integral multiples of 180°.

Connected to the demodulator 22 are three correlators 23, 24 and 25 which, by means of a control device 26, can be set for the applicable codes 1 and 2 and for a sync code applicable to the whole set of channels in the transmission zone. The control device 26 also serves for evaluating the organization data signals received, producing a read-out of the data for the services required by users and the data for the transmission channels provided for particular types of equipment, for the selection of switchable transmission channels freely available to the mobile station in the organization data flow, and an access signal for transmission to the base station BS on this selected transmission channel.

The output signal of the correlators 23, 24 and 25 is used on the one hand for deriving the symbol, frame and bit synchronization, and on the other hand for evaluating the instantaneous multipath profile. Since a standard synchronization code of appropriate level is sent out at the same instant in the combined group of channels (see No. P 35 11 430.4) synchronization identification and evaluation of the multipath profile are ensured.

The outputs of the correlators 23, 24 and 25 are connected to scanning circuits 27, 28, which scan the output signals of the correlators 23 to 25 and feed the result to a decision stage 29. The results of the scans performed in the decision stage 29, synchronously with the echoes of the multipath evaluations, are weighted in proportion to the amplitude of the echoes (by a device 30). The decision stage 29 has the task of estimating the transmitted code and the polarity of the code. The estimated value makes it possible to select the symbol that has most probably been transmitted. After the symbol-bit conversion in the decision stage 29, the output signal is fed to a TDM demultiplexer 31 connected to the decision stage 29. The demultiplexer 31 is connected to a channel decoder 32 at the output of which the transmitted data flow is again available. In digital speech transmission the digital speech signal is decoded in a speech decoder 33, in a D/A converter and fed to a connected loudspeaker.

If a mobile station MS has been equipped for example for a data service, the data appearing at the output of the channel decoder 32 can immediately be displayed or printed out.

What is claimed is:

1. In a digital radio transmission system comprising a plurality of base stations and mobile stations arranged in a cellular network and wherein messages to be communicated between each base station and the respective mobile stations assigned thereto are transmitted over respective communication channels, the improvement characterized in that each base station comprises multiplexing means for multiplexing messages to be transmitted from such base station to the mobile stations assigned thereto by a combination of three different modes of multiplexing, such modes including time division multiplexing of respective time slots in successive time frames, code-division multiplexing of such time frames in accordance with respective codewords, and frequency-division multiplexing of such code division multiplexed time frames at respective carrier frequencies, the respective base stations being identified by employing respective combinations of said codewords and said carrier frequencies; and each mobile station comprises multiplexing means for multiplexing messages to be transmitted from such mobile station to the base station assigned thereto by at least one of said modes of multiplexing.

2. A digital radio transmission system as claimed in claim 1, characterized in that the multiplexing means in each base station is adapted to multiplex messages to be transmitted to the mobile stations assigned to such base station by sequentially time division multiplexing, code division multiplexing and frequency division multiplexing such messages.

3. A digital radio transmission system as claimed in claim 2, characterized in that respective combinations of time-division and code-division multiplexing at each base station establish respective sets of message channels, and each base station is adapted to transmit respective sets of message channels at respective carrier frequencies.

* * * * *